United States Patent

Blackmer

[15] 3,681,618

[45] Aug. 1, 1972

[54] RMS CIRCUITS WITH BIPOLAR LOGARITHMIC CONVERTER

[72] Inventor: David E. Blackmer, Bulton Rd., Harvard, Mass. 01451

[22] Filed: March 29, 1971

[21] Appl. No.: 128,756

[52] U.S. Cl. ..................307/229, 328/145, 328/144, 333/14

[51] Int. Cl. ..................G06g 7/24

[58] Field of Search..328/144, 145; 333/14; 307/229

[56] References Cited

UNITED STATES PATENTS

| | | | |
|---|---|---|---|
| 2,916,702 | 12/1959 | Bigelow | 328/145 |
| 3,518,578 | 6/1970 | Oppenheim et al. | 328/145 |
| 3,423,578 | 1/1969 | Platzer et al. | 307/229 |
| 2,440,004 | 4/1948 | Brown et al. | 328/144 |
| 2,397,961 | 4/1946 | Harris | 328/144 |

*Primary Examiner*—James W. Lawrence
*Assistant Examiner*—Harold A. Dixon
*Attorney*—Schiller & Pandiscio

[57] ABSTRACT

A logarithmic converter having an operational amplifier input stage including a pair of diode junction feedback loops of opposite polarities. The converter includes a pair of fixed gain amplifiers connected to amplify the respective outputs of opposite polarities from the operational amplifier, and a corresponding pair of rectifiers for respectively half-wave rectifying the outputs of the fixed gain amplifiers. The outputs of the rectifiers are summed with one another. Lastly, the converter includes a source of constant current and a capacitor coupled to the source and to the rectifier outputs so that the voltage across the capacitor will tend to bring the long term average sum of the output currents from the rectifiers into equality with the current from the source.

13 Claims, 4 Drawing Figures

INVENTOR.
DAVID E. BLACKMER

BY

Schiller & Pandiscio
ATTORNEYS

INVENTOR.
DAVID E. BLACKMER

BY

Schiller & Pandiscio

ATTORNEYS

RMS CIRCUITS WITH BIPOLAR LOGARITHMIC CONVERTER

This invention relates to signal measurement and more particularly to measuring circuits responsive to the logarithm of the rms value of an input function.

A number of techniques are in current use for measurement of the rms value of an input signal. For example, the heating of a resistive element is used in thermocouple and hot wire instruments. Square law curves have been generated with vacuum tubes, field effect transistors, segmental diode approximation circuits, esaki diodes, and analog multipliers. All these techniques are limited to a dynamic range between 20 and 60 decibels and have a very limited crest factor tolerance at maximum input.

Various diode and transistor logarithmic converters exist in which $E_{out} = C + k \log I_{in}$, where $I_{in}$ is the input current to the device, $E_{out}$ is the output voltage from the device, and $C$ and $K$ are semiconductor constants. There have also been described bilateral circuits which take the logarithm of inputs in both polarities. One can multiply this logarithm by 2, take the antilogarithm to the same base, and average this output. Without more, this approach however, may suffer from a limited dynamic range as $e_{in}^2$ obviously involves wider voltage swings than $e_{in}$. Input dynamic ranges in excess of 100:1 require elaborate chopper stabilized amplifiers. The same comment applies to analog multiplier circuits used to derive $E^2$ or $E^2/4$.

It is a principle object of the present invention to provide a circuit capable of providing a very wide dynamic range of rms response. Yet other objects are to provide such a circuit in which the output is logarithmic, to provide such a circuit which exhibits a very high crest factor tolerance over the full dynamic range, and to provide such a circuit capable of handling input waveforms which are assymetrical or which have dc components.

Additionally in many measurement and control circuits, especially for audio signals, it is necessary to measure the envelope energy of an input function with rapid response and yet with low rectification ripple. This is a common requirement in the signal level detection channels of audio compressors and limiters. The use of either a peak or average sensing circuit with rapid recovery rates has been thought to inevitably lead to low frequency distortion and intermodulation.

Thus, another principal object of the present invention is to provide a circuit which provides rapid response to transient signals and a slower, rate-limited response to falling signal levels in an output which is logarithmically related to the rms value of the input. This results in a measurement or control function which is more nearly like the human ear in response to complex waveforms than peak or average detectors. Yet other objects of the present invention are to provide such a circuit having inherently low rectification ripple, and to provide a semiconductor inverter circuit with a logarithmic transfer characteristic over an extended bandwidth.

To achieve the foregoing and other objects generally the invention comprises at least one bilateral converter which provides an output signal related to the logarithm of the rms value of an input signal and means for deriving the antilogarithm of the output signal but upon a different logarithmic base so that the dynamic range of the converter is widely expanded. In one embodiment, two such converters are employed for converting input signals which are identical except that they are 90° phase separated. In a preferred embodiment, the converter comprises an operational amplifier with two feedback paths through semiconductor junctions of opposite conductivity, a pair of operational amplifiers for amplifying the output signal of the operational amplifier by respective factors of +2 and −2, and semiconductor junction means for rectifying the amplified signals into a common summing point connected to a capacitor and to a constant current source. By shunting the converter-amplifier portion of the circuit into a series connected capacitor and resistor connected to an inverted polarity output, the bandwidth of the converter is extended.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, references should be had to the following detailed description taken in connection with the accompanying drawings wherein.

Figure 1:
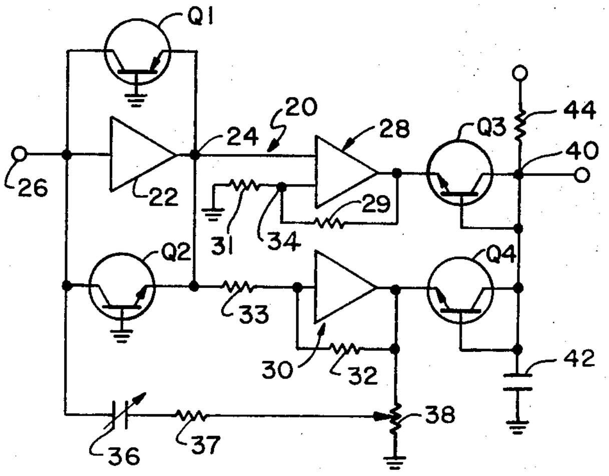
FIG. 1 is a circuit schematic showing details of a converter embodying the principles of the present invention.

A detailed version of a preferred embodiment of a converter according to the present invention is shown in FIG. 1. The bilateral converter 20 comprises a high gain inverting amplification stage 22 having a pair of oppositely conductive feedback paths through matched semiconductor junctions between output terminal 24 and input summing junction 26. Each semiconductor junction exhibits the property that $$E_o = C + K \log I_i; \quad (1)$$

where $E_o$ is the output voltage, $I_i$ is the input current, and $C$ and $K$ are substantially semiconductor constants. This is true of both polarities for $I_i$, hence the latter is an absolute value.

One of the feedback paths is the collector-emitter circuit of PNP transistor $Q_1$ while the other feedback path is the collector-emitter circuit of NPN transistor $Q_2$, the bases of both transistors being grounded. The emitters of transistors $Q_1$ and $Q_2$ are connected to the output of stage 22 and also to the inputs of a pair of operational amplifiers 28 and 30. Amplifier 28 is a non-inverting configuration and has a feedback resistor 29 coupled to non-inverting input 34 of the amplifier. Input 34 is also connected through resistor 31 to ground. Amplifier 30 has the usual feedback and input resistors 32 and 33 respectively coupled to the inverting input of the amplifier. Both amplifiers are adjusted so that for both polarities of an arbitrary dc input voltage, the output voltages $E_o$ are identical. It will be apparent to those skilled in the art that by choosing appropriate values for resistors 29 and 30 on the one hand, and resistors 32 and 33 on the other hand, the amplifiers can provide $E_o$ as the input voltage $E_i$ (i.e. the voltage at output terminal 24) multiplied respectively by the factors +2 and −2.

If the input current to the converter formed of transistors $Q_1$ and $Q_2$ and amplifier 22 is low, e.g., under .1 $\mu$a, the high frequency response of these transistors tends to be reduced. Such falloff of frequency gain of transistors $Q_1$ and $Q_2$ is due to increased carrier diffusion time at the lower base-emitter voltage and also to collector-emitter capacitance. The effect of the collector-emitter capacitance ($C_{CE}$) of the junctions in these transistors and the circuit stray capacitance can be overcome or neutralized by introducing into the circuit of the present invention capacitor 36 and resistor 37 connected in series between input terminal 26 and the output of inverting operational amplifier 30, preferably through potentiometer 38 which is adjusted to provide an optimum high frequency response. Resistor 37 should be selected or adjusted to provide an essentially capacitive current $I_f$ through capacitor 36 at all frequencies of interest, but also to limit the response beyond this frequency band and thus make feedback loop stabilization less difficult. It will be appreciated that $I_f$, for proper neutralization, should be equal in magnitude and opposite in phase to the current flowing through the other circuit capacitance of the converter. This neutralization has been observed to increase the bandwidth, for example for $I_{in}$ of 10 nanoampere, from less than 1 KHz to over 20 KHz.

Connected to the output of the amplifiers 28 and 30 are respective diodes or diode-connected npn transistors $Q_3$ and $Q_4$ having conduction characteristics through their collector-emitter circuit such that $$I=\log^{-1}\left(\frac{E-C}{Kd}\right) \qquad (2)$$

where $I$ is the current being conducted, $E$ is the collector-emitter voltage, $Kd$ is inherently identical to the value of $K$ in equation (2) for either of transistors $Q_1$ or $Q_2$, and $C$ is a circuit constant.

The bases of both transistors are, of course, connected to their respective collectors and the latter are tied together at summing junction 40. In turn, the latter is connected to one side of storage capacitor 42, the other side of which is grounded. A constant current source shown in the form of resistor 44 is connected between output terminal 40 and terminal 45 at which a voltage is applied. Other current sources known in the art are useful in this regard. The current source should be of such polarity as will maintain transistors $Q_3$ and $Q_4$ in their conductive (collector-emitter circuit) state.

Figure 2:
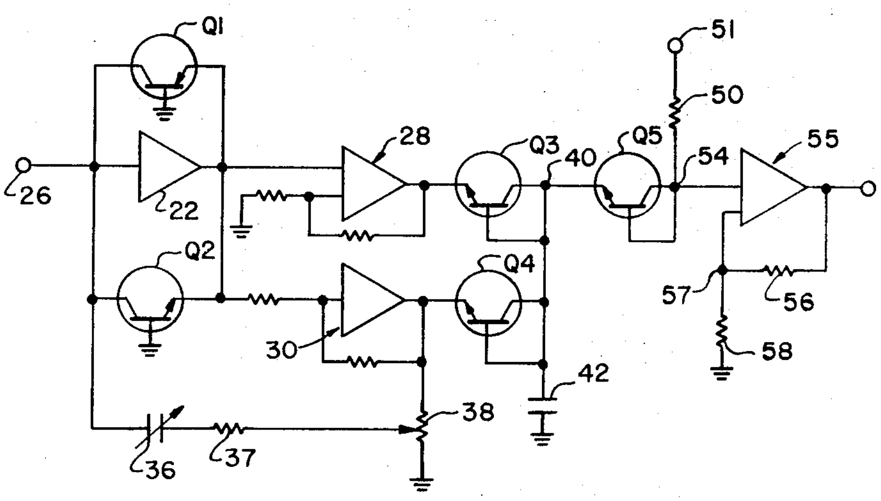
FIG. 2 is a circuit schematic showing the details of a temperature compensated version of the device of FIG. 1.

As shown in FIG. 2, in a circuit similar to that of FIG. 1, as means for correcting at least part of the offset temperature coefficient effects of transistors $Q_1$ and $Q_2$, connected to junction 40 is the emitter of temperature compensating npn transistor $Q_5$, diode-connected base to collector. Exemplary of a substantially constant current supply is resistor 50, connected between, on one hand, the coupled base and emitter of transistor $Q_5$ and, on the other hand, power input terminal 51 at which a desired bias voltage is to be applied. As will be seen later, the constant current to transistor $Q_4$, either directly as in FIG. 1 or through the collector-emitter circuit of transistor $Q_5$ as in FIG. 2, in connection with capacitor 42 is very important in the present invention.

The collector of transistor $Q_5$ is connected to inverting input terminal 54 of potentiometric operational amplifier 55 which has its feedback resistor 56 connected between the amplifier output and noninverting input 57. The latter is also connected through resistor 58 to ground.

Figure 3:
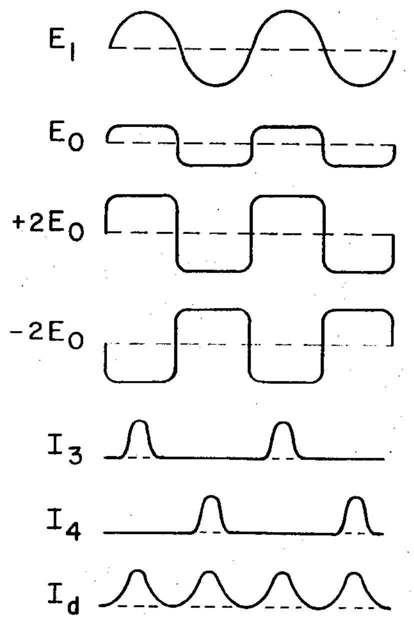
FIG. 3 is a group of idealized waveforms on a common time base, explanatory of the operation of the structures of FIGS. 1 and 2.

In operation, an input signal $E_i$ applied to input terminal 26 of either the embodiment of FIG. 1 or FIG. 2 is converted by amplifier stage 22 and transistors $Q_1$ and $Q_2$ according to equation (1) to yield an output signal $E_{oA}$ which has a value logarithmically related to $E_i$. Now, assuming that $E_i$ is a steady-state sinusoid, the output signal $E_{oA}$ will appear as a log-sinusoid, all as shown in FIG. 3. Multiplication by a factor of 2 in opposite polarities respectively by amplifiers 28 and 30 provides $-2E_{oA}$ and $+2E_{oA}$ as shown in FIG. 3. These latter two signals are essentially phase displaced (by 180°) versions of one another. Each of these signals is fed through or anti-log rectified by a respective one of diode-connected transistors $Q_3$ and $Q_4$. The output signals, $I_3$ and $I_4$ from those transistors are thus, as shown in FIG. 3, half-waves which each have an instantaneous value related respectively to $E_i^2$. When summed at junction 40, they yield a $\sin^2$ current waveform having a long term average current value $I_d$ equal to the current $I_c$ from resistor 50.

It is important to note that signals $I_3$, $I_4$ and $I_d$ are all currents, and that the foregoing description of operation relates to a steady state or quasi-steady state of input signal $E_i$. In such case, as noted, the average output current $I_d$ is substantially equal to the constant current $I_c$ being provided by resistor 50. Capacitor 42 will maintain the collector voltage of transistors $Q_3$ and $Q_4$, and thus the input voltage to amplifier 55 at a substantially steady value $E_c$. Now, when $E_i$ changes from one steady-state (keeping in mind that a steady state ac is here intended to mean one which stays at a substantially fixed rms value) to another, the transient change causes $I_d$ to vary considerably from the value of $I_c$. This serves to swing the voltage on capacitor 42 in value and direction tending to create the desired steady-state equality between $I_c$ and the average value of $I_d$.

The value of $E_c$ is linearly related to the rms value of $E_i$ in decibels because the instantaneous current in anti-log rectifier $Q_3$ and $Q_4$ is proportional to $E_i^2$. The capacitance of capacitor 42 and the magnitude of current $I_c$ determine the recovery rate for falling signals, i.e., how quickly $E_c$ will change to bring $I_d$ to the value of $I_c$ when $I_d << I_c$. The response to rising signals will be a non-linear function related to $E_i^2$. For a small increment of input $E_i$, the response time constant is due to the product of the diode impedances of transistors $Q_3$ and $Q_4$ times the capacitance of capacitor 78. For example, the initial rate of rise for a 20 db step increase in input $E_i$ will be about 100 times greater than for a 0.1 db increase. This variable time response appears to be a basic property of this circuit and will bear a fixed relationship to the rate-limited fall-back rate for any such circuit. Thus, the fall-back rate specification is adequate to describe the relative time response characteristic of the circuit.

Circuit 26 as thus far described does not have full temperature correction for the temperature dependent offsets of transistors $Q_3$ and $Q_4$. It should be noted, for example, that for an input current of $\pm 1$ $\mu$a to transistor $Q_3$, $V_{be}$ will change about 2.7 mv/°C. A change in log slope of about +.33%/°C may also be expected. Because of the gain provided by amplifiers 28 and 30, transistors $Q_3$ and $Q_4$ correct only half of the voltage temperature coefficient of transistors $Q_1$ and $Q_2$. In FIG. 2, transistor $Q_5$ operates at constant current provided by the voltage source applied at terminal 51, hence does not affect the rms properties of the circuit but does correct the remaining offset temperature coefficient of transistors $Q_1$ and $Q_2$. The gain provided by amplifier 55, of course, is set by the ratio of associated resistors 56 and 58. If resistors having a temperature coefficient of gain equal to $1/T_k$ (where $T_k$ is the Kelvin temperature) are used, then the slope temperature coefficient can be fully corrected.

Because as noted the instantaneous value of $I_d$ is proportional to $E_i^2$, and the average value of $E_c$ is proportional to the logarithm of the rms value of $E_i$, the allowable crest factor is determined by the current range over which $$I_d = \log^{-1} \frac{(E-C)}{Kd}$$

and by the value of the constant current $I_c$ provided by resistor 79 and the available current from amplifiers 65 and 66. With values such as $I_c = 10^{-6}$ A, and $10^{-2}$ A available from amplifiers 28 and 30, input voltage crest factors of 100 can be accommodated.

Figure 4:
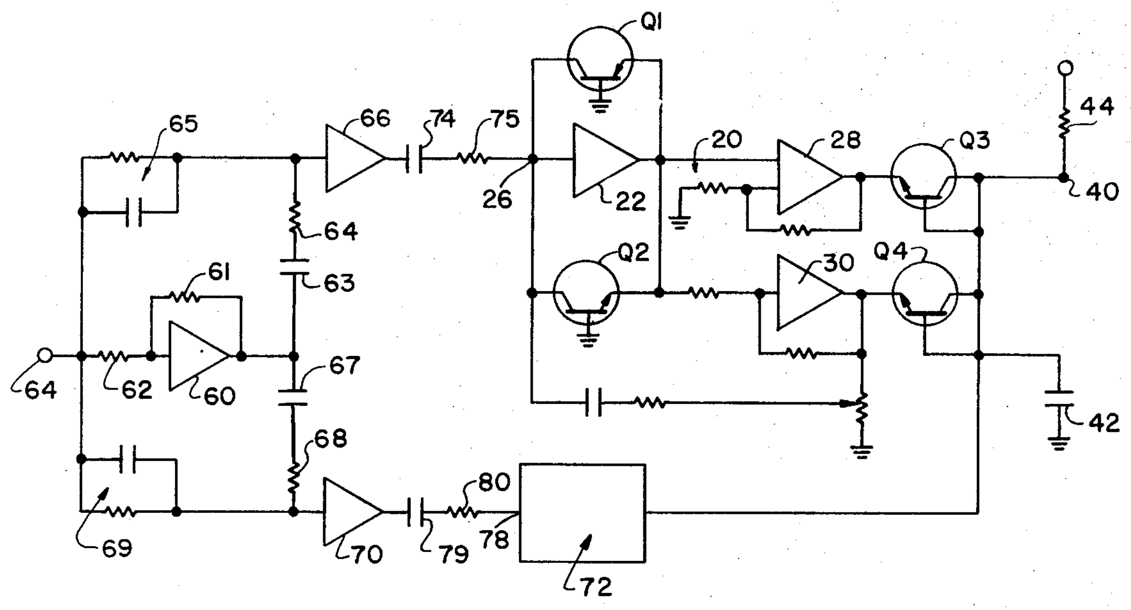
FIG. 4 is a circuit schematic showing a circuit incorporating the principles of the present invention to provide a system responsive to the logarithm of the rms value of an input function, with low rectification ripple and extended bandwidth.

In FIG. 4 there is shown an embodiment of the present invention employing two of the structures of FIG. 1 to achieve a substantially ripple-free output related to the logarithm of the instantaneous rms value of an input signal. In the embodiment of FIG. 4 there is included means for providing a constant phase difference such as a 90° phase network which includes an operational amplifier formed of the usual very high gain, inverting stage 60 with feedback resistor 61 between the output and input of a stage 60, and input resistor 62 coupled to input terminal 64. The output of stage 60 is connected through series connected capacitor 63 and resistor 64 to one side of RC tank 65 and to the input of unity gain follower 66. The other side of RC tank 65 is connected to input terminal 64. Similarly, the output of stage 60 is connected through series connected capacitor 67 and resistor 68 to one side of RC tank 69 and to the input of unity gain follower 70. The other side of tank 69 is connected to terminal 74. Similar constant phase difference circuits and the operation thereof are well known and typically are discussed in *Proc. IEEE*, Vol. 58, No. 6, p. 593, June 1970 and *IEEE Trans. Ckt. Theory*, Vol. CT16, No. 2, p. 89, May 1969.

The output of each of followers 66 and 70 are connected to respective bilateral logarithmic converters responsive to the rms value of its input signal, with a very wide range of response and a very high crest factor tolerance over the full dynamic range and of the type disclosed hereinbefore in connection with FIGS. 1 and 2. Only one converter such as that shown in FIG. 1 is shown in FIG. 4 in detail as circuit 20. The other converter, circuit 72, is substantially identical and is therefore shown only in block form. Input terminal 26 of circuit 20 is connected to the output from follower 66 by coupling capacitor 74 and series resistor 75. Similarly, input terminal 78 of circuit 72 is connected to the output from follower 70 through series connected coupling capacitor 79 and resistor 80. Preferably, each of circuits 26 and 72 provides an output current which is proportional to the square of its input current in any quasi steady-state interval of the input function. Hence, the outputs of circuits 26 and 72 are connected to junction 40 so that the current from the two circuits can be summed. Because of the 90° phase network formed, inter alia, of amplifier 60, these output currents sum to meet the condition that $$\mathrm{Sin}^2\theta + \cos^2\theta = 1$$

or will thus provide a substantially ripple-free output logarithmically related to $E_i$ (or to the input current as the case may be).

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A bilateral logarithmic converter for a time varying input signal, said converter comprising in combination:

means for generating from said input signal, for any polarity thereof, first output signal as a logarithm of said input signal, means for amplifying said first output signal by a fixed gain which is respectively negative and positive on separate channels, means for half-wave rectifying the signal of each of said channels so as to obtain substantially the antilogs thereof in the form of currents having instantaneous values related to the square of said first input signal;

means for summing the half-wave rectified currents from each of said channels, a constant current source, and charge storage means so connected to said source and to said means for summing that the potential at said charge storage means tends toward a value which will bring the long term average sum of said half-wave rectified currents into substantial equality with the constant current from said source.

2. A converter as defined in claim 1 wherein said means for generating comprises a high gain, inverting amplification stage including a pair of oppositely poled first semiconductor diode junctions each disposed in a respective feedback loop around said stage.

3. A converter as defined in claim 2 wherein each of said first junctions exhibit the property such that $$E_o = C_1 + K \log I;$$

where $I_i$ is the absolute value of an input current to each first junction, $E_o$ is the output voltage from each first junction and $C_1$ and $K$ are semiconductor constants, and wherein said means for half-wave rectifying comprises a pair of second semiconductor junctions each disposed for conduction in a respective one of said channels, each of said second junctions has conduction characteristics such that $$I_c = \log^{-1}\left(\frac{E_1 - C_2}{K}\right)$$

where $I_c$ is the current being conducted by each second junction, $E_1$ is the voltage across each second junction, $C_2$ and $K$ are semiconductor constants.

4. A converter as defined in claim 2 including another feedback loop around said stage including a capacitor and means for feeding through said capacitor an inversion of the current flowing at the output of said stage.

5. A converter as defined in claim 4 wherein said means for amplifying comprises a pair of amplifiers, a first of which is inverting, the second of which is non-inverting, and wherein said means for feeding comprises said first amplifier.

6. A converter as defined in claim 1 wherein said fixed gain of said means for amplifying is a factor of 2.

7. A converter as defined in claim 1 wherein said current source provides a current poled to maintain said rectifying means in conduction.

8. A converter as defined in claim 1 including a temperature-compensating semiconductor having a junction disposed between said current source and said means for summing.

9. A converter as defined in claim 8 including a potentiometric amplifier having a gain inversely proportional to absolute temperature, the input of said potentiometric amplifier being connected to the output of said compensating transistor.

10. A converter as defined in claim 1 wherein said means for generating comprises a high gain, inverting amplification stage including a pair of first transistors of opposite conductivity type having their respective emitter-collector circuits in corresponding feedback loops around said stage, said first transistors being matched to have substantially identical conduction properties, and wherein said means for half-wave rectifying comprises a pair of second transistors of the same conductivity type each having its emitter-collector circuit disposed in a respective one of said channels, said second transistor being matched to exhibit substantially identical conduction properties.

11. A converter as defined in claim 10 wherein said summing means comprises a summing junction, said charge storage means comprises a capacitor connected between said summing junction and system ground, and wherein like output terminals of said second transistors are connected to one another and to said summing junction.

12. A converter as defined in claim 11 including a temperature compensating transistor of the same conductivity type as said second transistor, having its collector-emitter circuit connected between said current source and said summing junction, said current source being poled to provide a current for maintaining said temperature-compensating and second transistors in conduction.

13. A circuit for converting time-varying input signal, and comprising in combination means for generating two first output signals substantially 90° phase separated and proportional to said input signal, first and second means respectively responsive to corresponding ones of said first output signals each logarithmically related to the rms amplitude of said input signal;

each of said first and second means including means for generating from the corresponding first output signal, a second output signal as a logarithm of said first output signal;

means for amplifying said second output signals by a gain factor of 2, said factor being negative and positive respectively for the second output signal from one and the other of said first and second means;

means for half-wave rectifying each of the amplified second output signals so as to obtain substantially the antilogs thereof in the form of output currents each having an instantaneous value related to the square of the respective second output signal;

means for summing all of said output currents from said first and second means at a junction, a constant current source coupled to said junction, and charge storage means coupled to said junction.

* * * * *